United States Patent
Vaclik

(10) Patent No.: US 10,542,310 B2
(45) Date of Patent: Jan. 21, 2020

(54) COMMUNICATION SYSTEMS

(71) Applicant: Nomad Spectrum Limited, Newcastle Upon Tyne (GB)

(72) Inventor: Paul Vaclik, Newcastle Upon Tyne (GB)

(73) Assignee: Nomad Digtal Limited, High Holborn, London (GB)

( * ) Notice: Subject to any disclaimer, the term of this patent is extended or adjusted under 35 U.S.C. 154(b) by 0 days.

(21) Appl. No.: 15/616,328

(22) Filed: Jun. 7, 2017

(65) Prior Publication Data

US 2017/0353754 A1    Dec. 7, 2017

(30) Foreign Application Priority Data

Jun. 7, 2016  (GB) .................................. 1609953.3

(51) Int. Cl.
| | |
|---|---|
| *H04N 21/414* | (2011.01) |
| *H04N 21/2187* | (2011.01) |
| *H04N 21/234* | (2011.01) |
| *H04N 21/422* | (2011.01) |
| *H04N 21/436* | (2011.01) |
| *H04N 21/482* | (2011.01) |

(52) U.S. Cl.
CPC ... *H04N 21/41422* (2013.01); *H04N 21/2187* (2013.01); *H04N 21/23406* (2013.01); *H04N 21/41407* (2013.01); *H04N 21/42204* (2013.01); *H04N 21/436* (2013.01); *H04N 21/4825* (2013.01)

(58) Field of Classification Search
None
See application file for complete search history.

(56) References Cited

U.S. PATENT DOCUMENTS

| | | | |
|---|---|---|---|
| 6,029,045 A | 2/2000 | Picco et al. | |
| 8,813,122 B1 | 8/2014 | Montie et al. | |
| 9,326,046 B1 | 4/2016 | Park et al. | |
| 2007/0157281 A1* | 7/2007 | Ellis | H04N 7/17309 725/134 |

(Continued)

OTHER PUBLICATIONS

EP17174792.6 Extended European Search Report dated Aug. 1, 2017 (8 pages).

(Continued)

*Primary Examiner* — Michael R Telan
(74) *Attorney, Agent, or Firm* — Michael Best & Friedrich LLP

(57) ABSTRACT

A method for providing media data to a media player on board a vehicle. The method comprises, at a device on board the vehicle, receiving from a remote device one or more media data segments of a first media stream to be played in a single media session. The media data segments are stored in a transient buffer upon receipt at the device on board the vehicle and before playback by the media player. The method further comprises generating a plurality of playlists for the single media session. The plurality of playlists comprise a first playlist comprising a first media data segment stored in the transient buffer, and a second playlist comprising a second media data segment stored in a storage device on board the vehicle, the second media data segment of a second media stream.

18 Claims, 7 Drawing Sheets

(56) References Cited

U.S. PATENT DOCUMENTS

| | | | |
|---|---|---|---|
| 2007/0220566 A1* | 9/2007 | Ahmad-Taylor | ........................... H04N 21/44222 725/89 |
| 2007/0256021 A1* | 11/2007 | Prager | .................. G11B 27/034 715/744 |
| 2008/0109556 A1* | 5/2008 | Karlberg | ................ H04N 7/163 709/231 |
| 2011/0078324 A1 | 3/2011 | Honma et al. | |
| 2011/0246661 A1* | 10/2011 | Manzari | ................. G06Q 30/02 709/231 |
| 2013/0174200 A1* | 7/2013 | Sinha | ............... H04N 21/47202 725/40 |
| 2015/0228000 A1* | 8/2015 | Bijor | .................. G06Q 30/0613 705/13 |
| 2016/0001712 A1 | 1/2016 | Hsu et al. | |

OTHER PUBLICATIONS

GB1609953.3 Search Report from the United Kingdom Intellectual Property Office dated Nov. 8, 2016 (1 page).

* cited by examiner

COMMUNICATION SYSTEMS

TECHNICAL FIELD

The present invention relates to methods and systems for providing data connectivity to a vehicle.

BACKGROUND

With the increased portability of computers, and the increasing sophistication of mobile devices such as mobile telephones and tablet computers, there is a growing demand for connectivity while on the move allowing, for example, connection with other devices, and with the Internet. One response to this demand is based upon devices having built-in long-range telecommunications capabilities, such as devices which make use of mobile telephone networks. While such solutions can be effective, they typically suffer from problems of low bandwidth and incomplete geographic coverage. The problem of low bandwidth is a particular issue when a user wishes to access content comprising a large quantity of data, and in particular time dependent data, where time dependent data is data which must arrive within a certain short timeframe to be valid, e.g. a stream of live TV media. The problem of incomplete geographic coverage is particularly problematic when a user is moving, given that data communication may be interrupted when a signal is lost (for example when a train on which the user is on enters a tunnel).

Typically, when a user wishes to consume streaming media data, such as a live TV broadcast, the user will initiate a media session on an application on their user device, such as a mobile phone. The application will then receive media data relating to the media session from a media server, for example. Very short delays and interruptions (in the order of a few seconds) in the delivery of the media data can be handled by existing technology. However, longer communications outages, which are likely when the user is on a moving vehicle, requires a solution which provides more advanced management of the media session.

SUMMARY

It is an object of an embodiment of the present invention to obviate or mitigate at least one of the problems set out above.

In the present specification the term "comprises" and its variants are not intended to exclude the presence of other integers, components or steps. Except where expressly indicated, terms such as "first", "second", etc. do not indicate an ordering, or a temporal relationship, but are merely used as labels to distinguish one integer, component, step, etc. from another integer, component, step, etc. Generally, references to devices receiving data is to be understood to include those devices actively fetching data as well as passively receiving the data.

According to a first aspect of the invention there is provided a method for providing media data to a media player on board a vehicle. The method comprises, at a device on board the vehicle, receiving from a remote device one or more media data segments of a first media stream to be played in a single media session. The media data segments are stored in a transient buffer upon receipt at the device on board the vehicle and before playback by the media player. The method further comprises generating a plurality of playlists for the single media session. The plurality of playlists comprise a first playlist comprising a first media data segment stored in the transient buffer, and a second playlist comprising a second media data segment stored in a storage device on board the vehicle. The second media data segment is a media data segment of a second media stream.

In this way, the single media session may include both media data that is received from the remote source, and media data that is stored locally. The single media session may therefore continue even where, for example, no or insufficient media data is received from the remote source. This avoids the need to begin new media sessions, and simplifies processing that occurs at the device on board the vehicle.

The first media stream may, for example, relate to a live broadcast, such as a live TV or radio broadcast. The storage device on board the vehicle may be volatile or non-volatile memory, and may be internal or external to the device. The second media stream may, for example, comprise a single image which is repeated. For example the second media stream may comprise a message for display on the media player. The message may, for example, indicate that a connection has been lost to the remote device and that the media associated with the first media stream will resume shortly. Alternatively, the second media data segment of the second media stream may comprise other media content, such as a video, an audible message, or may take any form.

The second media stream may be different to the first media stream.

It is to be noted that in the described example, a playlist comprising a media data segment is taken to mean that the playlist indicates a particular media data segment that should be played by the media player, rather than the playlist being made up of a series of media data segments themselves. The playlist may indicate any number of media data segments to be played. More generally, however, the playlist may take any form that indicates the media data segment. For example, the playlist may be formed from the media data segments themselves.

The media player may be configured to run at the device on board the vehicle, or at a further device, such as a client device.

As an option, the vehicle may be a train. Alternatively, however, the vehicle may take any form, such as for example, a bus, car, ship, or aircraft.

As an option, the first media data segment indicated in the first playlist in the media player is played in the single media session. As an option, the second media data segment indicated in the second playlist in the media player is played in the single media session. That is, the first and second media data segments may be played in the same, single media session, without starting a new media session.

As an option, the first playlist is generated on determination that a first condition is met. Optionally, the first condition may be that there is greater than a first threshold value of first media data segments in the transient buffer. For example, the first threshold value may be a threshold number of media data segments, a threshold play-length of media in the transient buffer, or a threshold size of data in the transient buffer. For example, for the first condition to be met, a sufficient number of media data segments may have been received from the remote device and loaded into the transient buffer.

As an option, the second playlist is generated on determination that a second condition is met. Optionally, the second condition is that there is less than a second threshold value of first media data segments in the transient buffer. For example, the second threshold value may be a threshold number of media data segments, a threshold play-length of media in the transient buffer, or a threshold size of data in the transient buffer. For example, for the second condition to be met, an insufficient number of media data segments may have been received from the remote device and loaded into the transient buffer. This may occur in instances where communication between the device and remote device is interrupted.

The first and second thresholds may be the same, or the first threshold may be less than or greater than the second threshold.

As an option, the second playlist comprises a second media data segment stored in the transient buffer. For example, the second playlist may comprise media data from both the transient buffer and the storage device.

As an option, a third playlist is generated comprising a third media data segment stored in the transient buffer. Optionally, the third playlist may be generated on determination that a third condition is met. For example, the third condition may be that there is greater than a third threshold value of media data segments in the transient buffer.

The third threshold value may be the same as any of the first threshold value and/or the second threshold value. Alternatively, the third threshold value may be greater than or less than any of the first and or second threshold values. For example, the third threshold value may be a threshold number of media data segments, or a threshold size of data in the transient buffer. For example, following a loss and re-establishment of connection, a greater threshold may be applied than previously used such that the media is only resumed (i.e. the third playlist is only generated), when the received media data from the remote device exceeds the greater threshold.

As an option, the third playlist is generated at a time after the second playlist has been generated. For example, the second playlist may be generated in response to a loss of connection between the device on board the vehicle and the remote device. The method may therefore include detecting a loss of connection between the device on board the vehicle and the remote device. Following re-establishment of the connection, the third playlist may be created. The method may therefore include detecting re-establishment of the connection between the device on board the vehicle and the remote device.

As an option, at the remote device, a media stream comprising media data is received from a media source. The media data segments may be generated from the media data. The media stream comprising the media data segments may be transmitted to the device on board the vehicle.

The media source may, for example, be a media outlet, such as a TV station or radio station.

The media stream comprising the media data segments may be the first media stream.

As an option, the media data segments may be stored in a second transient buffer prior to sending the media stream to the device on board the vehicle.

As an option, generating the media data segments from the media data may comprise segmenting the media data into the media data segments.

As an option, the remote device may advertise the availability of media data segments to the device on board the vehicle. As an option, the availability of media data segments is advertised on determination that a fourth condition is met. Optionally, the fourth condition may be that there is greater than a fourth threshold value of media data in the second transient buffer.

According to a second aspect of the invention there is provided a device for generating media playlists for a media player aboard a vehicle. The device comprises a first receiver for receiving from a remote device one or more media data segments of a first media stream to be played in a single media session, a first storage device for storing the received media data segments in a transient buffer upon receipt at the device on board the vehicle and before playback by the media player, a second storage device for storing media data segments belonging to a second media stream, and a processor for performing the method of the first aspect of the invention.

According to a third aspect of the invention there is provided a system for providing media data to a media player on board a vehicle. The system comprises the device of the second aspect, and a remote device. The remote device comprises a first receiver for receiving a media stream comprising media data from a media source, a processor for generating media data segments from the media data a transmitter for sending the media stream comprising the media data segments to the device on board the vehicle.

BRIEF DESCRIPTION OF THE DRAWINGS

An embodiment of the invention will now be described, by way of example, with reference to the accompanying drawings, in which.

DETAILED DESCRIPTION

Figure 1:
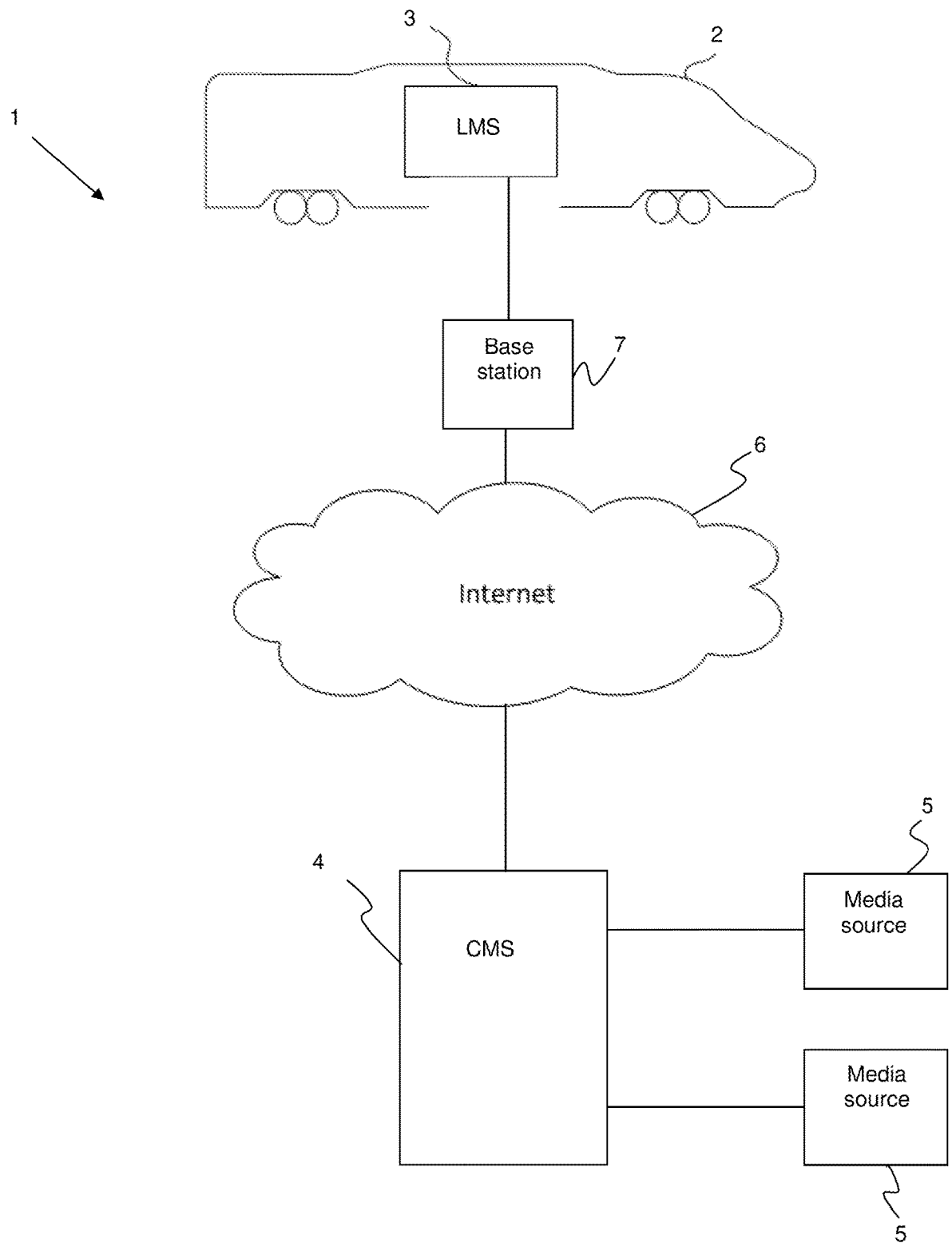
FIG. 1 schematically illustrates a network for transmitting media to a vehicle.

FIG. 1 schematically illustrates a network 1 that is used to transmit media data, such as Audio/Visual (AV) data, to a vehicle, and in particular to a train 2. It will be appreciated that other vehicles may be contemplated, such as buses, taxis, cars, ships, etc. The network 1 comprises a local media server (LMS) 3 located on the train 2, and a central media server (CMS) 4 located external from the train 2.

The CMS 4 is configured to receive media data from one or more media sources 5. The media data may, for example, be a live broadcast TV stream, or near live TV stream (e.g. a media stream that is delayed by a short duration from its initial broadcast time). However, the media stream need not be a live broadcast and may take any form. The CMS 4 may receive the media data from the media sources 5 via any suitable means. For example, the CMS 4 may receive the media data as a television transmission. Alternatively or additionally, the media data may be received over a network, such as via a Wde Area Network, such as the internet, and via any suitable media streaming protocol, such as HTTP live streaming (HLS), MPEG DASH, or MPEG over RTP, for example. The CMS 4 is further configured to split the media data up into suitably sized segments if the source media is not already provided in a suitably segmented format, and transmit the media data segments to the LMS 3. The CMS 4 may push the media data segments to the LMS 3, or may wait for a request from the LMS 3 to transmit the media data segments. The media data segments may be transmitted to the LMS 3 from the CMS 4 via a Wide Area Network (WAN), such as the internet 6, for example.

In an exemplary configuration, the LMS 3 is configured to wirelessly connect to a base station 7 in order to receive the media data segments. Alternatively or additionally, the CMS 4 is configured to transmit the received media data segments to the LMS 3 via one or more local distribution servers (not shown). The local distribution servers are configured to forward the received media data segments to the LMS 1. For example, the one or more local distribution servers may comprise one or more access points to which the LMS 3 can wirelessly connect in order to receive the media data segments. The one or more access points may be located at one or more locations along a route of the train 2, such as being located at one or more train stations.

In an exemplary configuration, the LMS 3 comprises a media player for playing the received media data segments. Client devices (not shown) aboard the train 2 may establish a data connection with the LMS 3 such that the client devices can watch the media on the media player. For example, LMS 3 may provide a WiFi access point to which client devices aboard the train 2 may connect. It will be appreciated that the term client device as used herein is to be taken to encompass any device that is capable of establishing a data connection with the LMS 3. For example, suitable client devices include mobile telephones, tablet computers, laptop computers, etc., and may be used by passengers, or staff (drivers, engineers, conductors, etc.) aboard the train 1.

Figure 2:
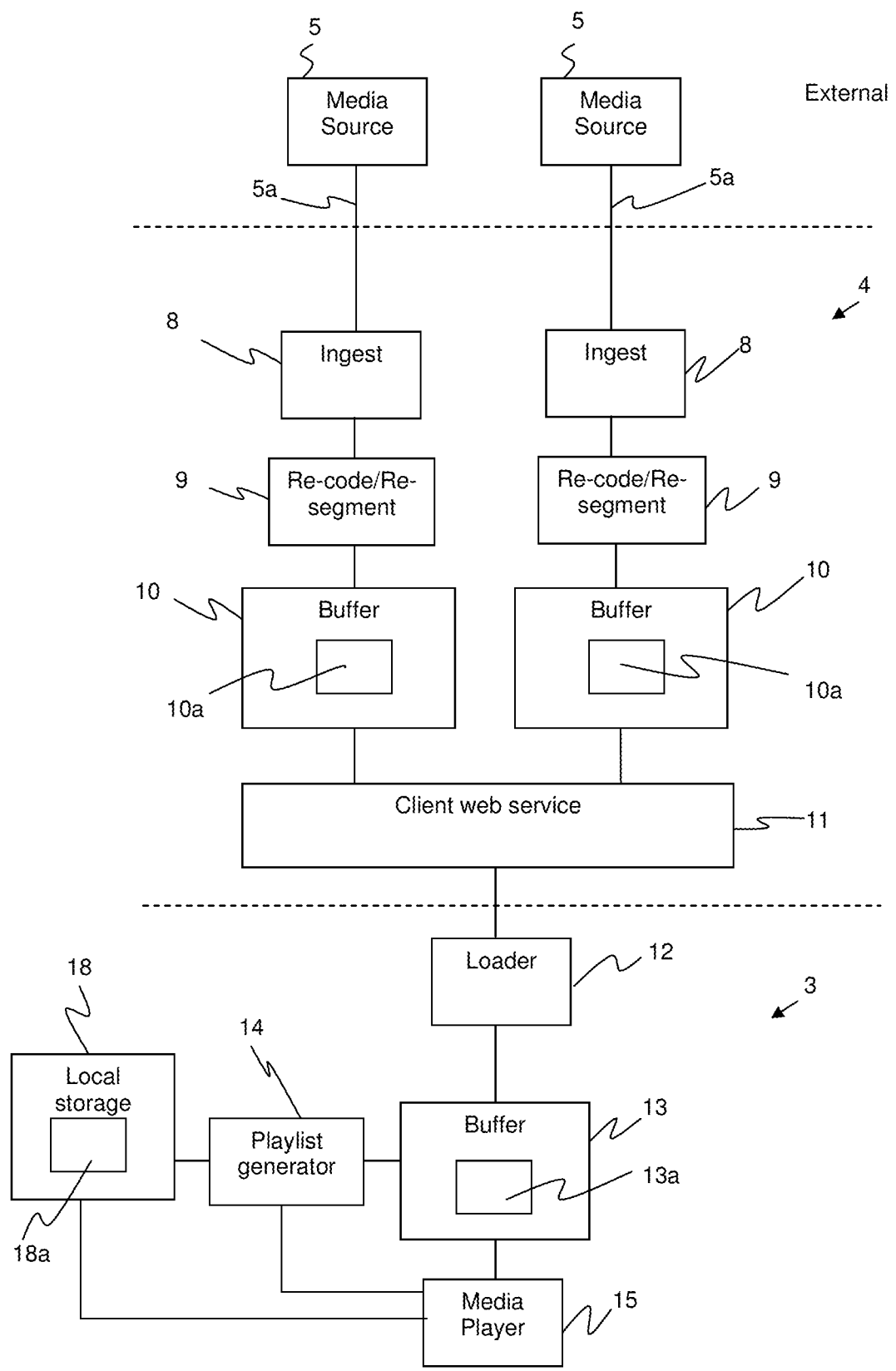
FIG. 2 schematically illustrates further components of the network shown in FIG. 1.

FIG. 2 schematically illustrates an exemplary arrangement of the components of the LMS 3 and CMS 4, where dotted lines schematically separate the LMS 3, CMS 4 and external networks. Each of the two media sources 5 broadcast a media stream 5a, which are received by the CMS 4. It will be appreciated that each media stream 5a may be a different media stream (i.e., have different content). It will further be appreciated that while two media sources 5 are illustrated, this is merely exemplary and more or fewer media sources may be used. The CMS 4 comprises an ingest component 8. In the example shown, there are two ingest components 8, one for each of the two media streams 5a. However, it will be appreciated that there may be more or fewer ingest components. The ingest component 8 is configured to receive the media data received in the media stream 5a from the media source 5. The media data may be transmitted from the media source 5 to the CMS 4 using any suitable media streaming protocol.

The CMS 4 comprises a re-code/re-segment component 9, which is arranged to receive the media data from the ingest component 8. In the example shown, there are two re-code/re-segment components 9, one for each ingest component 9. However, it will be appreciated that there may be more or fewer re-code/re-segment components. The re-code/re-segment components 9 are configured to split the received media data into media data segments. While the media data may arrive at the ingest component 8 in "segments", it is to be understood that the media data segments generated by the re-code/re-segment components 9 refer to media data segments of a more suitable form for buffering at the CMS 4 and/or providing to a vehicle based media server such as the LMS 3. For example, ingested media may be in a format which is not segmented, in which case it is segmented for the CMS 4 buffering process (described below) to function. Ingested media may already be in a segmented format (such as is used by HLS or MPEG DASH), in which case the CMS 4 may re-segment the media such that the segments are of an optimal file size for the transfer mechanism to the LMS 3, and/or the segments are of an optimal play length to minimise latency and synchronisation issues at the LMS 3. The CMS 4 need not comprise a re-code/re-segment component 9 in every configuration. For example, where media streams in HLS or MPEG DASH are provided, the media stream may already be provided in a suitable segmented form for transmission to a vehicle based media server, such as the LMS 3.

The CMS 4 comprises a buffer 10, which is configured to receive the media data segments from the re-code/re-segment component 9, and store the media data segments in the buffer 10. Buffered media data segments 10a may be queued in an order in which they are to be transmitted. In the example shown, there are two buffers 10, one for each re-code/re-segment component 9. However, it will be appreciated that there may be more or fewer buffers. The buffer 10 may provide transient storage. For example, media data segments may be deleted from the buffer as they are transmitted to the LMS 3. Media data segments may be stored more permanently in a data store (not shown) to allow for retransmission of media data segments which are not successfully transmitted to the LMS 3.

The CMS 4 comprises one or more web services 11. The one or more web services 11 are configured to perform one or more of the following functions:

a) allow the LMS 3 to discover which (if any) new media data segments are available in the buffer 10 since the last time the LMS 3 checked;

b) allow the LMS 3 to fetch individual media data segments from the buffer 10;

c) pass control and monitoring data between the CMS 4 and LMS 3.

In an exemplary configuration, the client web services 11 may only advertise the availability of media data segments to the LMS 3 when there are greater than a first threshold value of buffered media data segments 10a in the buffer. As an example, the first threshold may be a total media play length, or a total number of segments. The client web service 11 may stop advertising the availability of new media data segments to the LMS 3 if the number of buffered media data segments 10a drops below a second threshold value. For example, the client web service 11 may stop advertising the availability of new media data segments to the LMS 3 if the number of buffered media data segments 10a drops to zero, although it will be appreciated that the threshold may take other forms.

It will be appreciated that in certain embodiments, one ingest component 8, and/or one re-code/re-segment component 9, and/or one buffer 10 may handle multiple media streams rather than there being individual components 8, 9, 10 for individual media streams 5a.

In an optional configuration, the CMS 4 may manage the routing and switching of the media data segments such that an operator or an automated process can switch the presentation of media to one or more LMS 3 from one media source to another media source, which can then be reconstructed to form a continuous media stream. The CMS 4 may maintain timing and indexing information such that the CMS 4 can deliver media data segments requested by the LMS 3. For example, each media segment may be indexed (to maintain internal order) and timestamp information may be provided to allow the LMS 3 to determine when a given media segment is to be presented and its playback duration. If the CMS 4 switches media sources, the indexes and timings of the old and new sources may not be aligned. Therefore, the CMS 4 may re-index and re-timestamp the media data segments of the new source so that the LMS 3 sees a continuous stream of media data segments with consistent indexes and timestamps. The CMS 4 may provide administrative tools to send directives to the LMS 3 as part of a normal client-server interaction, such that the behaviour of each LMS 3 to which the CMS 4 connects can be centrally managed.

The LMS 3 comprises a loader application 12, which is configured to request and receive the media data segments from the client web service 11 of the CMS 4. For example, the loader application 12 may act to replicate a portion of the buffer 10 of the CMS 4. The amount of the buffer 10 which is replicated may depend on the particular configuration of the specific LMS 3. As one example, the CMS 4 may attempt to build up a buffer of 1000 seconds of media. In another example, a specific LMS 3 may be configured to maintain a queue of 300 seconds of the media and so the loader application 12 will attempt to load only the next 300 seconds of the buffer 10.

While the loader application 12 is described as running on the LMS 3, it will be appreciated that the loader application 12 can be run on a further device which is capable of utilising the network connection to the CMS 4 to load media data segments, and which is capable of writing the media data segments (and optionally any associated control information) to a storage location accessible by the LMS 3. Only one loader application 12 is shown, however it will be appreciated that there may be any number of loader applications, e.g. a different loader for each media data stream.

The LMS 3 comprises an LMS buffer 13. The LMS buffer 13 is configured to store received media data segments 13a from the CMS 4. This allows a local buffer to be built up at the train 2 which can mitigate communication outages. Media data segments 13a from the buffer are played by a media player 15. In an exemplary configuration, the LMS 3 may only present the media data segments 13a from the LMS buffer 13 to a media player 15 when a sufficient quantity of media data segments have been received, i.e. once a particular threshold (e.g. a number of segments or a quantity of data) in the LMS buffer 13 has been reached. Due to having to wait for a threshold to be satisfied before allowing playback of play media segments from the buffer 13, where the media data segments are from a live video stream, the live video stream may be somewhat delayed in comparison to the actual live feed. In an embodiment where the HLS or MPEG DASH protocol is used, the LMS buffer 13 effectively becomes an HLS feed or an MPEG DASH feed, which can be played by a media player 15. Only one LMS buffer 13 is shown, but it will be appreciated that there may be any number of buffers, e.g. a different buffer for each media stream.

The LMS 3 comprises a playlist generator 14 for generating playlists of media data segments relating to a media session for the media player 15. A generated playlist instructs the media player 15 which media data segments are to be played, and in which order. The playlist generator 14 is configured to determine what media data segments are in the LMS buffer 13. If there are a sufficient number of data segments in the LMS buffer 13, the playlist generator 14 generates a playlist which instructs the media player 15 to load specific media data segments from the LMS buffer 13. If there are an insufficient number of data segments in the LMS buffer 13, the playlist generator 14 generates a playlist which instructs the media player 15 to play alternative media data segments. Alternative media data segments may be locally stored media content, as described below.

The LMS 3 comprises a local data store 18. The local data store 18 stores media data 18a. The local data store 18 may be volatile or non-volatile memory. For example, the local data store 18 may be a hard drive or a RAM storage device. The locally stored media data 18a may be used in the event that there is no connection to the CMS 4, or in cases where a connection to the CMS 4 is lost. For example, in the event that a connection to the CMS 4 is lost, the media data segments stored in the LMS buffer 13 will be consumed by the media player 15 until there are insufficient media data segments in the LMS buffer 13 (i.e. there are none, or there are lower than a threshold value). Once the LMS buffer 13 is exhausted, the LMS 3 is configured to provide the locally stored media data 18a for playback at the media player 15, such that the media session initiated by the media player 15 is uninterrupted. In an exemplary configuration, this is achieved by the playlist generator 14 determining that there is an insufficient number of data segments (or quantity of data, length of stored video, etc.) in the LMS buffer 13, and generating a new playlist comprising the locally stored media data 18a. The locally stored media data 18a may comprise a message for display on the media player 15 stating that the connection has been lost and that the video will resume shortly, for example. Alternatively, the locally stored media data 18a comprise other media content, such as a video, an audible message or may take any form which is compatible with the media player 15.

The LMS 3 comprises the media player 15. The media player 15 plays media data segments according to a generated playlist. A client device can load the media player 15. For example, the client device may load the media player 15 as part of a web page supplied by the LMS 3 via a local wired or wireless network. Alternatively, in further configurations, the media player 15 may not be run on the LMS 3, but may instead by run on a client device, e.g. a media player application running on a user's mobile phone or tablet. The media player 15 could be embedded in an app on the client device or delivered as a plugin as part of a web page.

The above described configuration means that in the event that communication to the CMS 4 is temporarily lost, the LMS buffer 13 will be consumed without impacting the experience of a viewer. In the event that communication to the CMS 4 is so badly impacted that the buffer 13 is exhausted, the LMS 3 will seamlessly swap the media data relating to the live media stream, to the locally stored media data 18a. The LMS 3 will continually attempt to reconnect with the CMS 4 and when possible will renegotiate with the CMS 4 to recover the media stream. Once the LMS 3 has reloaded a sufficient number of data segments in the LMS buffer 13, media timings will be recalculated and the LMS 3 will seamlessly swap the media output back to the live media stream. In other words, the loss in communication is "hidden" from the media player 15, such that the media player 15 continues to engage in the same media session. Advantageously, an end user does not experience a frozen video, a blank screen, corrupted video or "reloading" symbol, the media player is not forced to re-key or resynchronise as a result of an unexpected break or discontinuity in the media that it receives, and the risk of the media player crashing or otherwise malfunctioning as a result of receiving an unexpected break or discontinuity in the media is removed.

FIGS. 3A to 3F schematically illustrate management of a playlist for a single media session, MS, at different time periods t. Note that the elapsed time between the times t may not necessarily be equal.

Figure 3A:
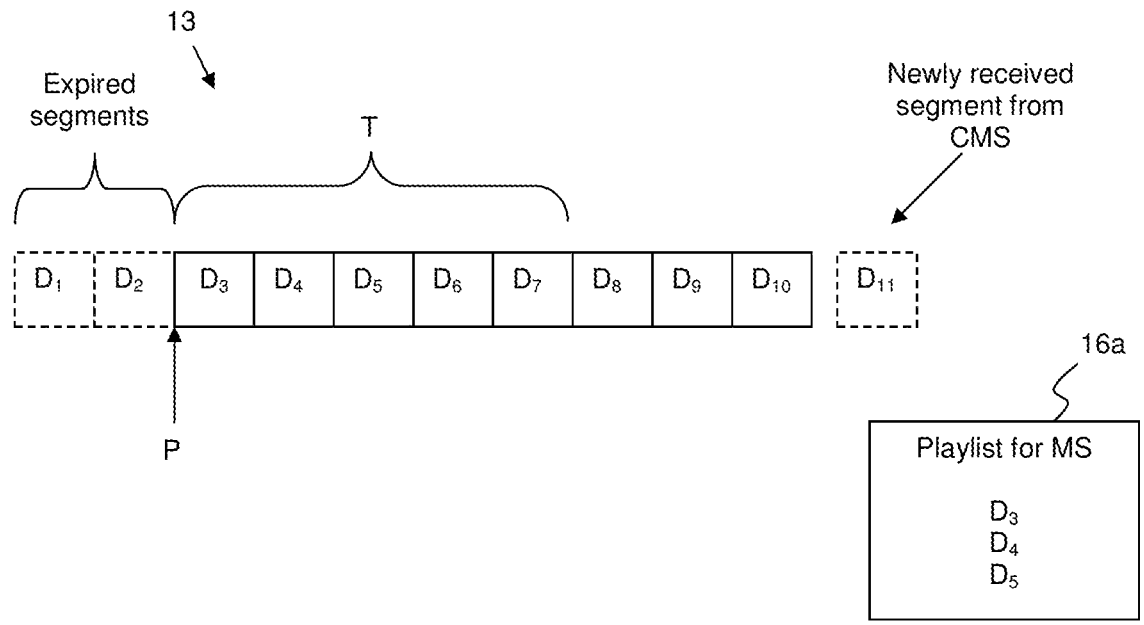
FIG. 3A schematically illustrates a first playlist being generated.

FIG. 3A shows a representation of the LMS buffer 13 and a first playlist 16a, at time t=1. Media data segments D1 to D10 have been received by the LMS 3 from the CMS 4, and have been loaded into the LMS buffer 13 as described above. The media data segments may, for example, correspond to a live video feed, such as of a TV program. Media data segments D1 and D2 have already been played and are shown in a dotted outline to indicate that D1 and D2 have expired.

The LMS 3 has sufficient buffer to play live media content, indicated by threshold buffer T, which contains media data segments D3 to D7. The LMS 3 maintains a current play point P to the current playing segment, which, for example, may be based on the current server time and aggregate lengths of previously played segments. The playlist generator 14 generates a first playlist 16a of media data segments from the current play point P. In the example shown, the playlist contains three media data segments, D3, D4 and D5. However, it will be appreciated that this is just an example, and any number of media data segments may be included in a playlist. The first playlist 16a indicates to the media player 15 that that D3, D4, and D5 should be played next, and in that order. The first playlist 16a is used by the media player 15 to load the correct media data segments in the correct order for media session MS. Segments older than the current play point P will be deleted. In parallel, the LMS 3 will continue to load new media data segments as they become available from the CMS 4 (D11 for example is being loaded at time t=1).

Figure 3B:
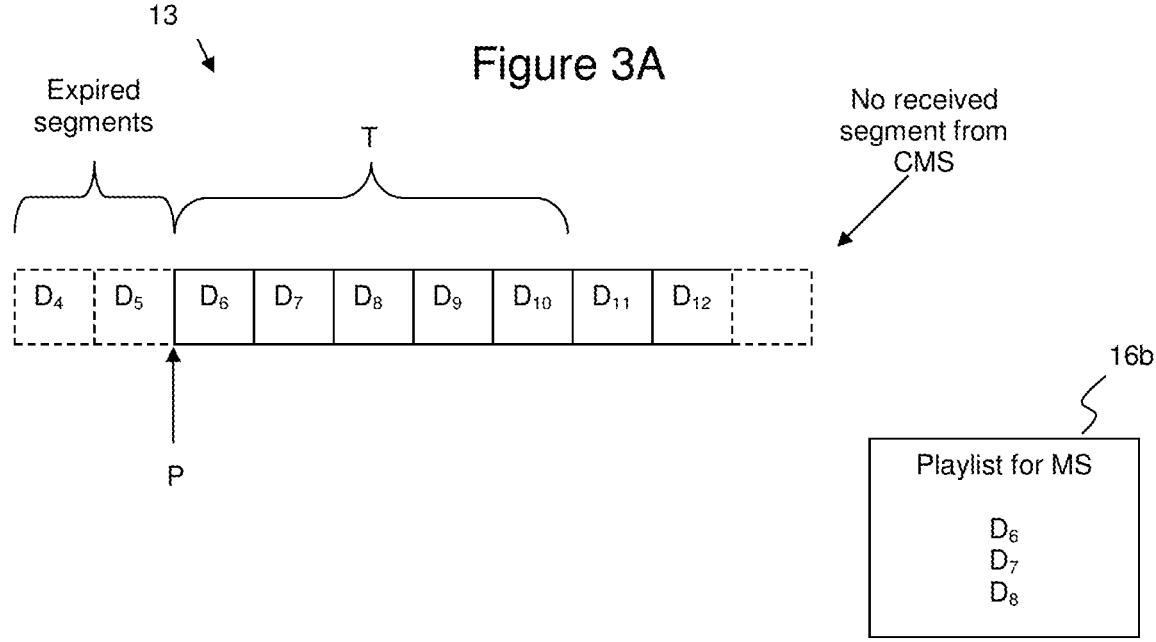
FIG. 3B schematically illustrates a second playlist being generated.

FIG. 3B shows a representation of the LMS buffer 13, and a second playlist 16b at time t=2. Between time t=1 and time t=2, media data segments D3, D4 and D5 have been played by the media player 15, and media data segment D6 is now at the current play point P. New media data segments D11 and D12 have been received from the CMS 3 and have been loaded into the LMS buffer 13. However, the media data segments following D12 have not been received and so have not been added to the LMS buffer 13. As an example, the train 2 may be travelling in an area with low communication coverage, such that the base station 7, or other connection point, cannot transmit the media data segments from the CMS 4 to the LMS 3. However, as the LMS buffer 13 contains sufficient media data segments (i.e. the threshold T is full, containing media data segments D6 to D10), the second playlist 16b is generated by the playlist generator 14 and indicates that that D6, D7, and D8 should be played next, in that order.

Figure 3C:
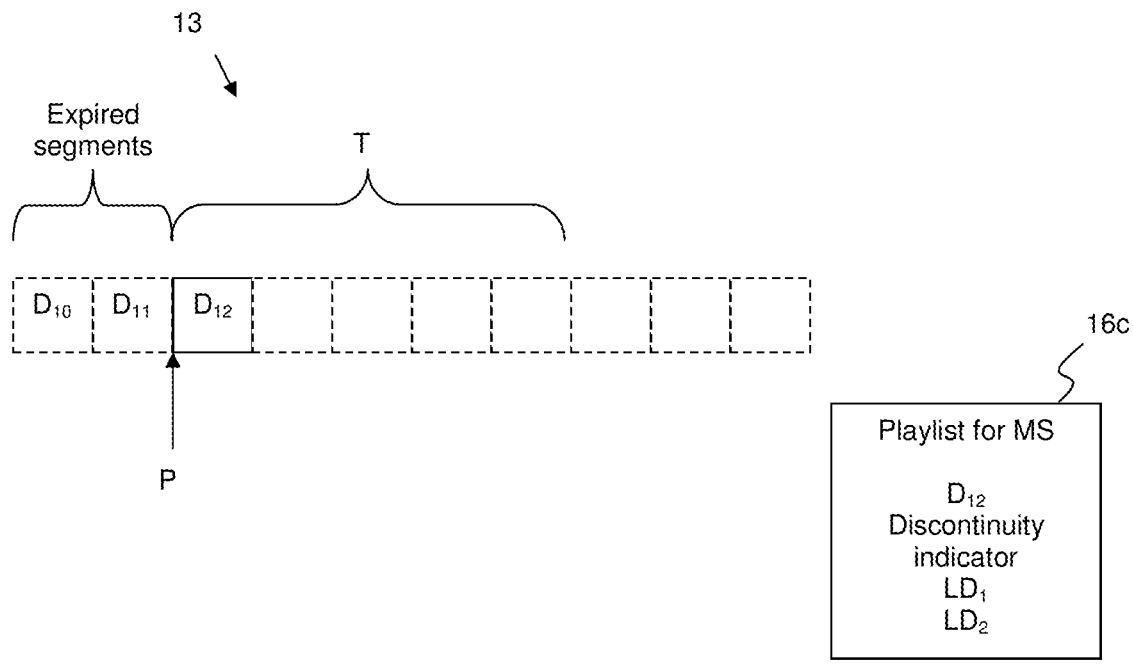
FIG. 3C schematically illustrates a third playlist being generated.

FIG. 3C shows a representation of the LMS buffer 13 and a third playlist 16c at time t=3. Between time t=2 and time t=3 no further media data segments have arrived at the LMS 3. The current play point P is at segment D12. There are insufficient received media data segments to build a playlist, and so the playlist generator 14 generates a third playlist 16c which includes locally stored media data LD1 and LD2. LD1 and LD2 may be segments of locally stored content 18a on the local data store 18. The locally stored media data 18a may correspond to a message stating that the connection has been lost and that the live video feed will resume shortly, for example. Depending on the particular protocol being used (such as when using HLS protocol), a discontinuity indicator may be inserted into the third playlist 16c between the received media data segment D12 and the locally stored media data segment LD1 to indicate to the media player 15 that the media stream is discontinuous between segments D12 and LD1.

Figure 3D:
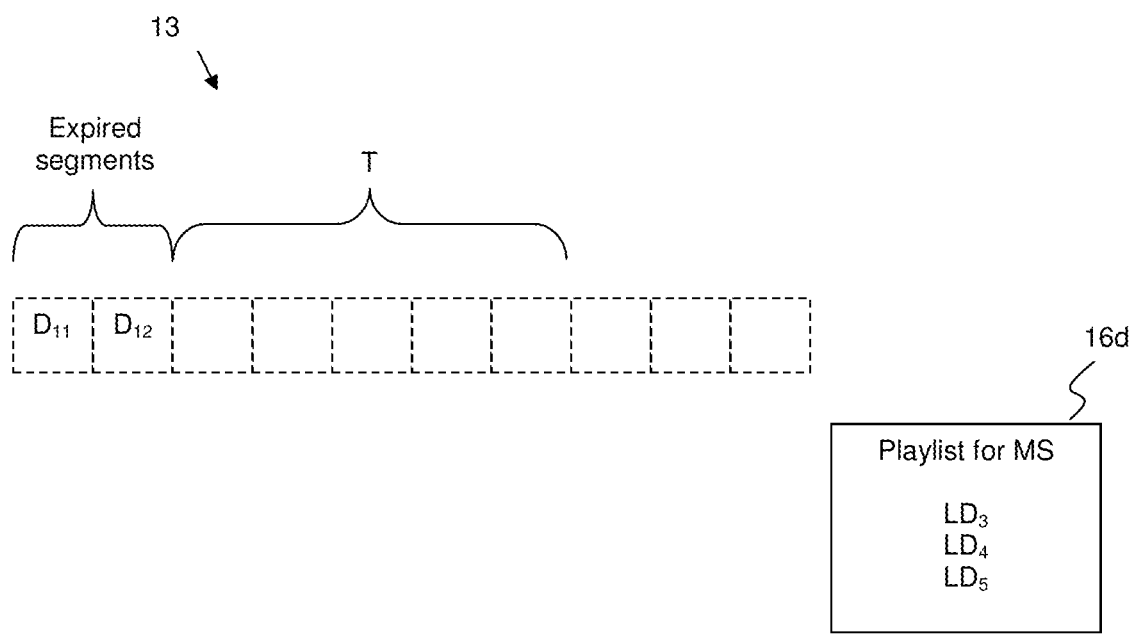
FIG. 3D schematically illustrates a fourth playlist being generated.

FIG. 3D shows a representation of the LMS buffer 13 and a fourth playlist 16d at time t=4. Between time t=3 and time t=4 no further media data segments have arrived at the LMS 3 and the LMS buffer 13 is completely empty. The playlist generator 14 generates the fourth playlist 16d based entirely on local content LD3, LD4 and LD5. The playlist generator 14 will continue to cycle through local media data segments for as long as there is an insufficient media buffer available (e.g. for as long as threshold buffer T is not full).

Figure 3E:
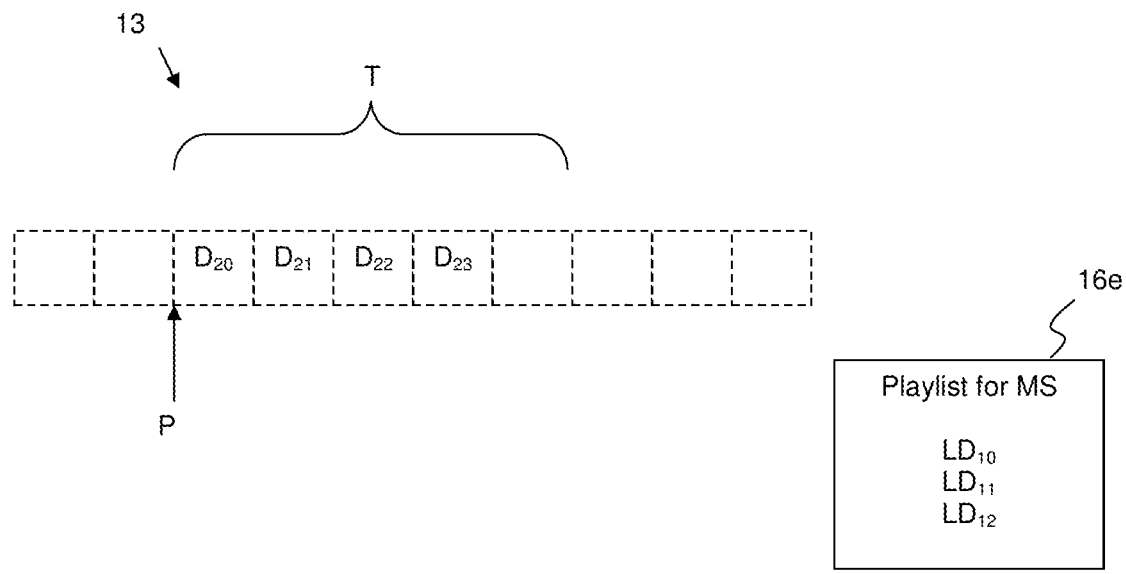
FIG. 3E schematically illustrates a fifth playlist being generated.

FIG. 3E shows a representation of the LMS buffer 13 and a fifth playlist 16e, at time t=5. Between time t=4 and time t=5 connectivity between the LMS 3 and CMS 4 has been restored and the LMS buffer 13 is refilling. Media data segments D20 to D23 have been received and loaded into the LMS buffer 13, but the amount of received data has not yet reached the minimum buffer threshold T. As the threshold T has not been met, the playlist generator 14 will continue to present a playlist based entirely on local content, which in the example shows a fifth playlist 16e generated containing locally stored media data LD10, LD11 and LD12.

Figure 3F:
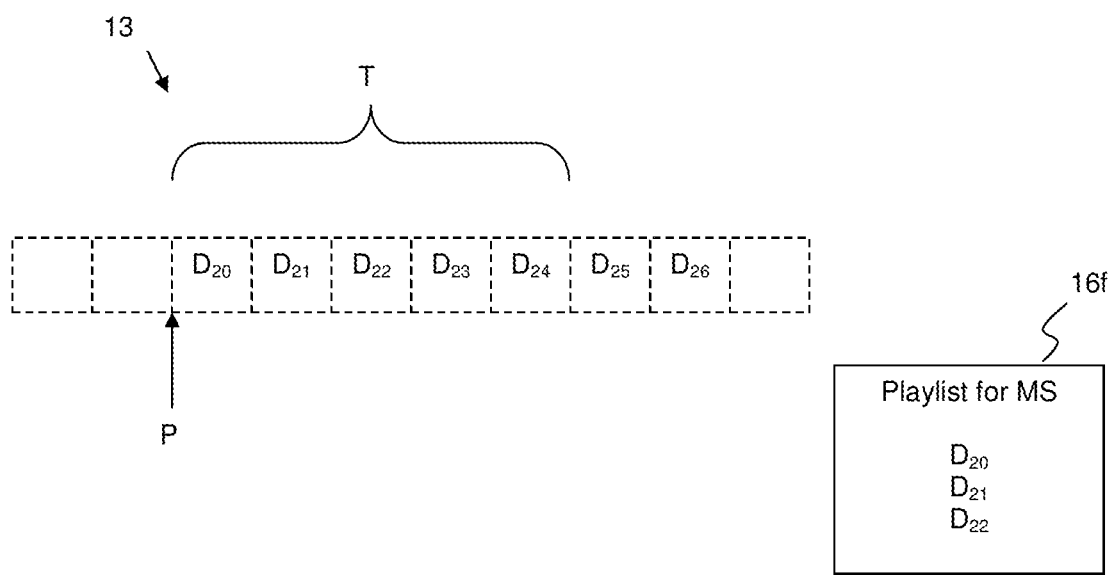
FIG. 3F schematically illustrates a sixth playlist being generated.

FIG. 3F shows a representation of the LMS buffer 13 and a sixth playlist 16f, at time t=5. Between time t=4 and time t=5 sufficient media data has been received such that the LMS buffer 13 has reached the minimum threshold T such that the playlist generator 14 can generate a playlist including received media data. The playlist generator 14 resets the current play point P to the first available media data segment in the LMS buffer 13, which in the example shown is D20 and generates the sixth playlist 16f based on the received media data segments. The LMS 3 may need to reset its internal time synchronisation following the drop and re-establishment of connection to the CMS 4.

Advantageously, embodiments of the present invention provide a method in which media data received in connection with media session MS is uninterrupted, even in the event that no further media data segments are received, such as during a loss of connection between the LMS 3 and the CMS 4.

While the threshold T was described in relation to a number of segments in the LMS buffer 13, it will be appreciated that the threshold T may relate to the size of data in the buffer or any other metric.

In some configurations, the LMS 3 may determine that a connection to the CMS 4 has been lost, and, prior to the media player 15 playing all of the buffered media data segments, may generate a playlist containing the locally stored content in anticipation of the buffer becoming exhausted.

Figure 4:
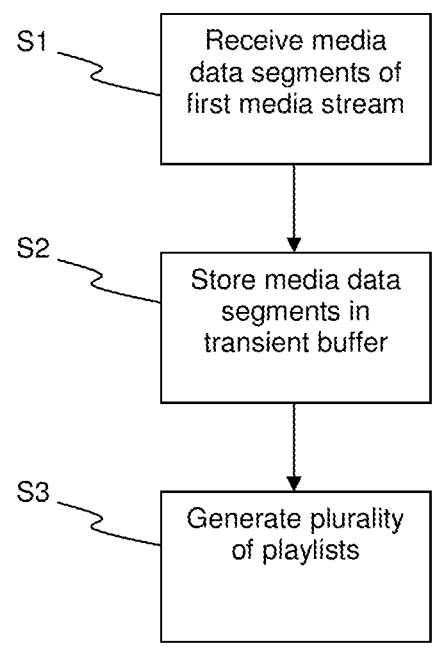
FIG. 4 is a flowchart showing processing carried out at a Local Media Server (LMS) of the network of FIG. 1.

FIG. 4 illustrates a flowchart of a method at a device on board a vehicle, for providing media data to a media player on board a vehicle, according to an exemplary configuration. The device may, for example, be the LMS 3 as described above.

At step S1, one or more media data segments of a first media stream to be played in a single media session is received from a remote device. For example, the remote device may be the CMS 4 as described above. The first media stream comprising the media data segments may, for example, relate to a live TV broadcast.

At Step S2, the one or more media data segments are stored in a transient buffer upon receipt at the device on board the vehicle and before playback by the media player. For example, the transient buffer may be the LMS buffer 13 as described above.

At step S3, a plurality of playlists for the single media session are generated. The plurality of playlists comprise a first playlist comprising a first media data segment stored in the transient buffer, and a second playlist comprising a second media data segment stored in a storage device on board the vehicle, the second data segment belonging to a second media stream. The first playlist may, for example, be the first playlist 16a as described above. The second playlist may, for example, be the third or fourth playlists 16c, 16d as described above.

Figure 5:
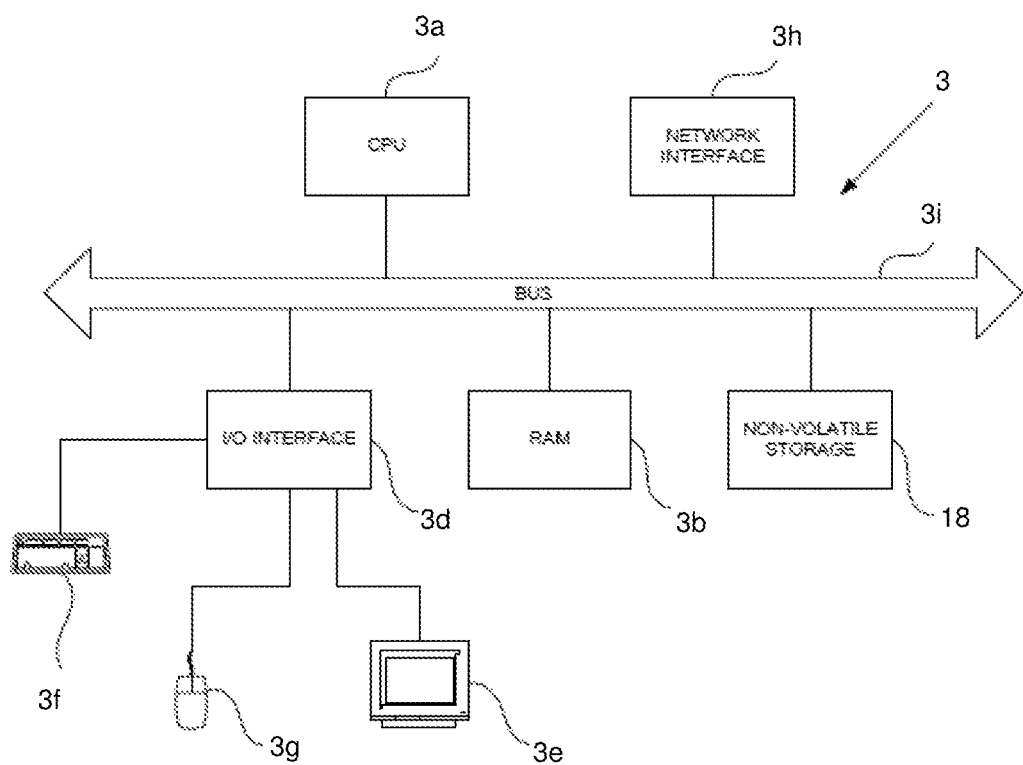
FIG. 5 is a schematic illustration of components of a device that may be used to implement a device of the network of FIG. 1.

FIG. 5 schematically illustrates an exemplary arrangement of components which may be used to implement the LMS 3. A similar arrangement of components to that illustrated in FIG. 5 may also be used to implement other devices, for example the CMS 4 and/or the client devices.

It can be seen that the LMS 3 comprises a CPU 3a which is configured to read and execute instructions stored in a volatile memory 3b which takes the form of a random access memory. The volatile memory 3b stores instructions for execution by the CPU 3a and data used by those instructions. For example, the instructions may include the instructions for causing the LMS 3 to carry out the processing described above with reference to FIG. 4.

The LMS 3 further comprises an I/O interface 3d to which are connected peripheral devices used in connection with the LMS 3. More particularly, a display 3e is configured so as to display output from the LMS 3. Input devices are also connected to the I/O interface 3d. Such input devices include a keyboard 3f and a mouse 3g which allow user interaction with the LMS 3. A network interface 3h allows the LMS 3 to be connected to appropriate computer networks, such as the Internet 6, and so as to be able to send and receive from and to other computing devices such as the CMS 4. The CPU 3a, volatile memory 3b, the storage device 18, I/O interface 3d, and network interface 3h, are connected together by a bus 3i.

It will be appreciated that the arrangement of components illustrated in FIG. 5 is merely exemplary, and that the LMS 3 may comprise additional or fewer components than those illustrated in FIG. 5. Indeed, the LMS 3 may comprise a plurality of computers, similar to, or arranged differently from, that shown in FIG. 5. For example, the LMS 3 may comprise a plurality of computers respectively adapted to provide, inter alia, a web server, an application server, a gateway server and a database server, etc. That is, it is to be understood that the LMS 3 may be implemented using any appropriate configuration as will be readily appreciated by those skilled in the art. It will also be appreciated that the CMS 4 and client devices may each comprise computers implemented similarly to the LMS 3, or again using any appropriate configuration.

It has been explained in the preceding description that the LMS 3 is arranged to provide wireless network connectivity on board the train 2 such that passengers travelling on the train 2 can use mobile computing devices to connect to the LMS 3. It will be appreciated that in some embodiments of the invention the LMS 3 is not adapted to provide wireless network connectivity on board the train 2. Such embodiments can be useful in providing, for example, telemetry services and closed circuit television. In such cases, data items received at the LMS 3 from the CMS 3 may comprise data items for use by the LMS 3 itself.

The preceding description has been concerned with an embodiment in which the LMS 3 is associated with a train.

It will be appreciated that the methods described herein are in no way limited to trains, but are instead widely applicable to any situation in which data communication is provided to a moving person or object. In particular, the methods described can be used to provide data communication to other vehicles (e.g. buses, cars, ships, etc.)

While the media data has generally been described as relating to a live TV program, it will be appreciated that the media data may relate to any media or multimedia presentation for example, such as, but not limited to, a live podcast or radio program. While the CMS 4 has been shown as serving a single LMS 3, it will be appreciated that the CMS 4 may serve many LMSs 3, which may be located on many different vehicles. In this way, media data, such as a TV program, may be sent to multiple vehicles at the same time.

Although specific embodiments of the invention have been described above, it will be appreciated that various modifications can be made to the described embodiments without departing from the scope of the claims. That is, the described embodiments are to be considered in all respects exemplary. In particular, where a particular form has been described for particular processing, it will be appreciated that such processing may be carried out in any suitable form arranged to provide suitable output data.

What is claimed is:

1. A method for providing media data to a media player on board a vehicle, the method comprising, at a device on board the vehicle:
   receiving from a remote device a plurality of media data segments of a first media stream to be played in a single media session, the media data segments being stored in a transient buffer upon receipt at the device on board the vehicle and before playback by the media player;
   automatically generating a plurality of playlists for the single media session, said generating comprising:
      automatically generating a first playlist comprising a first media data segment stored in the transient buffer;
      providing the first playlist to the media player causing the media player to play the first media data segment indicated in the first playlist in the single media session;
      automatically generating a second playlist comprising a second media data segment stored in a storage device on board the vehicle, wherein the storage device and the transient buffer are separate storage locations, the second media data segment of a second media stream, and a third media data segment, the third media data segment stored in the transient buffer, the third media data segment received at the device after receipt of the first media data segment, and wherein the second playlist is generated on determination that there is less than a second threshold value of media data segments in the transient buffer; and
   providing the second playlist to the media player when all media segments from the first playlist have been played, causing the media player to play the second and third media data segments indicated in the second playlist in the single media session without having to start a new media session.

2. A method as in claim 1, wherein the first playlist is generated on determination that a first condition is met.

3. A method as in claim 2, wherein the first condition is that there is greater than a first threshold value of first media data segments in the transient buffer.

4. A method as in claim 1, further comprising generating a third playlist comprising a fourth media data segment stored in the transient buffer.

5. A method as in claim 4, wherein the third playlist is generated on determination that a third condition is met.

6. A method as in claim 5, wherein the third condition is that there is greater than a fourth threshold value of media data segments in the transient buffer.

7. A method as in claim 5, wherein the third playlist is generated at a time after the second playlist has been generated.

8. A method as in claim 1, further comprising, at the remote device:
receiving a fourth media stream comprising media data from a media source;
generating the media data segments from the media data;
transmitting the first media stream comprising the media data segments to the device on board the vehicle.

9. A method as in claim 8, further comprising, at the remote device, storing the media data segments in a second transient buffer prior to sending the first media stream to the device on board the vehicle.

10. A method as in claim 8, wherein generating the media data segments from the media data comprises segmenting the media data into the media data segments.

11. A method as in claim 8, further comprising, at the remote device:
advertising the availability of media data segments to the device on board the vehicle.

12. A method as in claim 11, wherein the media data segments are advertised to the device on board the device on determination that a fourth condition is met.

13. A method as in claim 12, wherein the fourth condition is that there is greater than a fourth threshold value of media data segments in the second transient buffer.

14. A method as in claim 1, wherein the transient buffer and the storage device are included in separate hardware components.

15. A device for generating media playlists for a media player aboard a vehicle, comprising:
a receiver for receiving from a remote device one or more media data segments of a first media stream to be played in a single media session;
a first storage device for storing the received media data segments in a transient buffer upon receipt at the device on board the vehicle and before playback by the media player;
a second storage device for storing media data segments belonging to a second media stream, wherein the second storage device and the transient buffer are separate storage locations; and
a processor configured to generate a plurality of playlists for the single media session, said generating comprising
automatically generating a first playlist comprising a first media data segment stored in the first storage device,
providing the first playlist to the media player causing the media player to play the first media data segment indicated in the first playlist in the single media session,
automatically generating a second playlist comprising a second media data segment stored in the second storage device, and a third media data segment, the third media data segment stored in the transient buffer, the third media data segment received at the device after receipt of the first media data segment, and wherein the second playlist is generated on determination that there is less than a second threshold value of media data segments in the transient buffer, and
providing the second playlist to the media player when all media segments from the first playlist have been played, causing the media player to play the second and third media data segments indicated in the second playlist in the single media session without having to start a new media session.

16. The device as in claim 15, wherein the transient buffer and the second storage device are included in separate hardware components.

17. A system for providing media data to a media player on board a vehicle, the system comprising:
a device including
a receiver for receiving from a remote device one or more media data segments of a first media stream to be played in a single media session;
a first storage device for storing the received media data segments in a transient buffer upon receipt at the device on board the vehicle and before playback by the media player;
a second storage device for storing media data segments belonging to a second media stream, wherein the second storage device and the transient buffer are separate storage locations; and
a processor configured to generate a plurality of playlists for the single media session, said generating comprising
automatically generating a first playlist comprising a first media data segment stored in the first storage device,
providing the first playlist to the media player causing the media player to play the first media data segment indicated in the first playlist in the single media session,
automatically generating a second playlist comprising a second media data segment stored in the second storage device, and a third media data segment, the third media data segment stored in the transient buffer, the third media data segment received at the device after receipt of the first media data segment, and wherein the second playlist is generated on determination that there is less than a second threshold value of media data segments in the transient buffer, and
providing the second playlist to the media player when all media segments from the first playlist have been played, causing the media player to play the second and third media data segments indicated in the second playlist in the single media session without having to start a new media session; and
the remote device, the remote device comprising
a receiver for receiving a media stream comprising media data from a media source,
a processor for generating media data segments from the media data, and
a transmitter for sending the first media stream comprising the one or more media data segments to the device on board the vehicle.

18. The system as in claim 17, wherein the transient buffer and the second storage device are included in separate hardware components.

* * * * *